Figure 1:
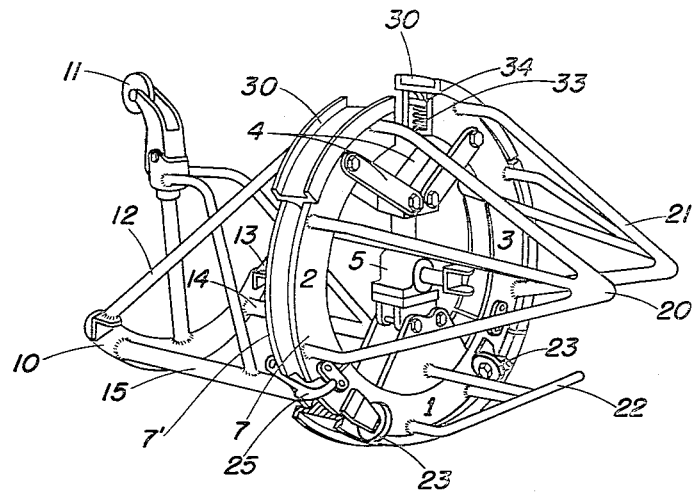

April 10, 1956      J. M. STEVENSON      2,741,206
INTERNAL ALIGNMENT PIPE CLAMPS
Filed April 8, 1952      2 Sheets-Sheet 1

INVENTOR
JOHN M. STEVENSON

United States Patent Office 2,741,206
Patented Apr. 10, 1956

2,741,206

INTERNAL ALIGNMENT PIPE CLAMPS

John M. Stevenson, Grapevine, Tex.

Application April 8, 1952, Serial No. 281,249

3 Claims. (Cl. 113—103)

This invention relates to internal alignment pipe clamps employed for effecting alignment of the ends of two adjacent pipes preparatory to their being welded together in the field and to hold them while the welding operation is being performed.

Large diameter pipes for oil and gas pipe lines are manufactured under rigid controls and are normally precisely cylindrical in shape when fabricated at the mill but during subsequent shipment and handling they often become deformed so that when the ends of two pipes are brought together in the field they do not precisely register and devices termed "alignment clamps" are therefore customarily employed to restore the pipe ends temporarily to annular cross section preparatory to making the welded joint which thereafter keeps the pipes together despite any inherent tendency of either to assume an out-of-round contour.

One clamp which has been devised for the purpose comprises articulated segmental shoes actuated by an expanding jack which are entered in the juxtaposed ends of two pipes and the jack then operated to expand the shoes outwardly and thereby bring the pipe ends to substantially circular shape. Usually these clamps comprise three such shoes, two of them each having an end hinged to an end of the third whereby each spans approximately one third the circumference of the pipe; hence particularly when a major out-of-round condition is encountered, considerable relative circumferential movement between the pipe and these shoes must take place while the pipe ends are being brought into conformity with the contour of the shoes and frictional resistance thereto may be so great as to cause undue crowding of the metal at the ends of the pipes or even inhibit bringing them into concentricity. Moreover when there is a difference in the circumference of two pipes to be joined which must therefore be compensated for in the welding it is substantially impossible to distribute this difference uniformly circumferentially of the joint with the result that one portion of the latter connects the pipes precisely in alignment while at another portion circumferentially remote therefrom there is considerable misalignment.

It is therefore a principal object of the invention to provide an alignment clamp comprising improved pipe engaging shoes and associated mechanism whereby in the operation of aligning the pipes by means of the clamp relative circumferential movement between the pipe engaging elements and the pipe is reduced to a minimum and frictional resistance to such movement substantially eliminated.

A further object is to provide an improved pipe alignment clamp adapted during the aligning operation to exert different degrees of force on the respective pipes at localized areas in correspondence with their configuration thereby to bring the pipes into perfect alignment and thereafter to distribute substantially uniformly circumferentially of both pipes the forces exerted against them to hold them in juxtaposed aligned relation while they are being welded together.

Figure 2:
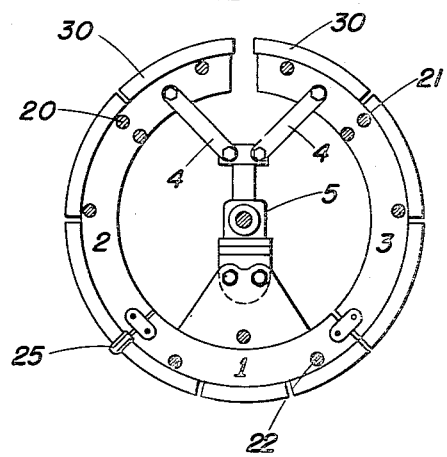
Figure 3:
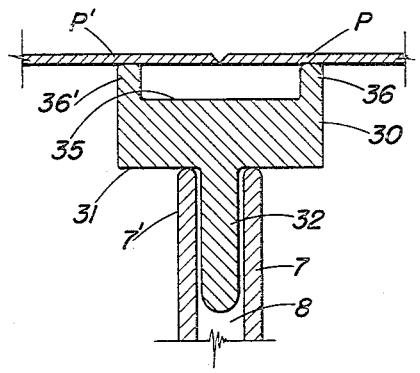
Figure 4:
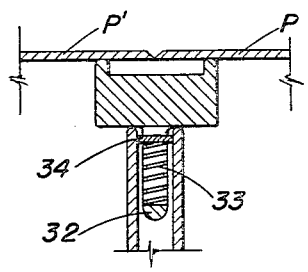
Figure 5:
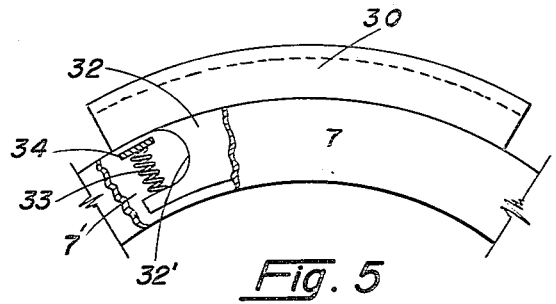

Other objects, purposes and advantages of the invention will hereinafter appear or will be understood from the following description of a preferred embodiment of it as shown in the accompanying drawings, in which Fig. 1 is a perspective view of an internal alignment pipe clamp constructed in accordance with the invention with certain parts omitted and others broken away into section, Fig. 2 is a diagrammatic end view of the said clamp likewise with certain parts omitted and others similarly broken away, Fig. 3 a fragmentary radial section of the clamp in association with two pipes brought together and aligned with the aid thereof preparatory to welding, Fig. 4 another fragmentary radial section on a different plane than Fig. 3 and a smaller scale, Fig. 5 is a fragmentary end view on a slightly smaller scale of the clamp removed from the pipe and partly broken away to show internal construction and, Fig. 6 a considerably enlarged fragmentary sectional view generally corresponding to Fig. 3 but illustrating the operation of the clamp when the pipe ends are out of alignment.

Referring now more particularly to the drawings the clamp shown therein in general comprises a bottom segment 1 to the ends of which are hinged substantially similar complementary upper segments 2, 3 respectively adjacent the free ends of which links 4 are pivoted for connecting the segments with a suitable jack 5 mounted on the bottom segment and including a coupling adapted to receive the end of a power transmitting rod (not shown) inserted through the adjacent pipe after the clamp is in position whereby the jack may be operated to retract the links toward the bottom segment and thereby contract the clamp as a whole or to move them in the opposite direction to expand it radially, each of the three segments comprising arcuate plates 7, 7' secured together in spaced apart relation and so defining a slot 8 which extends circumferentially about the entire clamp.

Projecting outwardly from the segments in opposite directions are guiding structures those on one end of the clamp including a shoe 10 and guide roller 11 secured by bars 12, 13, 14 and 15 to the proximate faces of the segments for facilitating entry of the clamp into one pipe and angular guides 20, 21 and 22 extending in the opposite direction from their other faces and rollers 23 to facilitate the rough centering of the other pipe in respect to the clamp when two pipes are being assembled preparatory to the formation of a joint. The clamp also carries a latch or end stop 25 which limits insertion of the clamp into one pipe prior to the second being assembled therewith, this latch being shaped for depression by the second pipe when engaged thereby. The elements thus far described constitute substantially a pipe clamp of known type and require no further reference.

In accordance with my invention each of the segments instead of being designed to directly contact the pipe walls when the clamp is in use carries a plurality of arcuate leverage shoes 30 all substantially identical in construction and each comprising a head 31 and medial fin 32 rigid therewith adapted to extend between the plates 7, 7' of the segments 1, 2, 3 into slot 8; they are held loosely in operative relation with the segments by springs 33 biasing recessed end portions 32' of fins 32 against abutments 34 spanning plates 7, 7' of the segments adjacent the ends of the shoes and welded or otherwise secured to the former. The shoes 30 may be steel castings or welded up from steel plate, and any suitable number of them may be associated with each segment, three being generally preferred.

The outer arcuate face of each shoe is provided with a circumferential groove 35 defined by upstanding pressure ribs 36, 36' respectively adapted to engage the inner walls of juxtaposed pipes P, P' and as the loose mounting of fin 32 in the slot 8 permits a limited lateral tilting of the shoes about the edges of the plates 7, 7' as fulcrums, when the clamp is disposed in operative relation to two pipe ends at their junction the shoes accommodate themselves to longitudinal non-alignment of the pipes at localized zones circumferentially of the joint even when considerable irregularity obtains.

Consequently when the segments are thereafter urged radially outward by operation of the jack to force all the shoes outwardly with their ribs 36, 36' in engagement with the pipe walls, if the latter be out of longitudinal alignment at localized points maximum aligning forces are brought to bear at those portions of one pipe or the other which lie respectively more closely adjacent the clamp axis than the corresponding portions of the other pipe while those lying at the greater distances from the clamp axis supply in effect supports or fulcrums for the leverage shoes considered as levers of the third class. In other words as the clamp expands, each shoe under the influence of the power supplied by one or the other of the plates 7, 7' of the segment gradually swings about the fulcrum formed by the engagement of the shoe rib 36 or 36' as the case may be with the adjacent pipe, the force exerted against the shoe by the plate acting in a plane relatively close to that in which said force is resolved against the innermost pipe considered with respect to the plane of the lever fulcrum, i. e. that in which the shoe engages the other pipe. As the segment moves radially outward it therefore rapidly brings the innermost pipe into conformity with its mate which is subjected to materially less radial force until the shoe attains equilibrium upon becoming seated on both plates 7, 7' of the segment, after which substantially equal pressures are exerted through ribs 36, 36' of the shoe and in cooperation with the other shoes of the clamp quickly bring the pipes into perfect alignment and roundness throughout the circumference of their ends. In Fig. 6 the point designated by the letter X at the edge of plate 7 denotes the approximate point of power application to the shoe, considered as a lever whose fulcrum is formed by rib 36' when the right hand pipe in said figure requires the greater expanding force through being at that point the closer of the two pipes to the clamp axis, and the corresponding point Y on the other plate 7' denotes the point of its application when the shoe is tilted in the opposite direction as when the condition of the pipe ends is reversed and the rib 36' instead of supplying a fulcrum, then bears the load on the lever.

Figure 6:
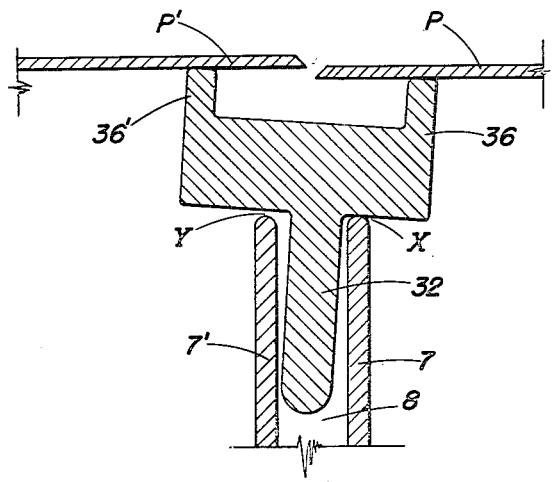

It is evident that when the condition of the mechanism is as illustrated in Fig. 6 the point X is closer to the transverse plane in which the expanding force of the adjacent segment is exerted against the pipe P by rib 36 than to the plane in which it is resolved against the pipe P' by rib 36' and any reaction of the pipe P' radially inward against the rib 36' is afforded a mechanical advantage, considering the point X as a fulcrum and the contact of rib 36 with the pipe P as the load bearing point which supplements the relatively direct effect of the adjacent segment. The combined effects of these forces rapidly bring the pipe ends into precise alignment with but a minimum of relative motion and consequent friction between the shoes and the pipes and after equilibrium of all the leverage shoes is reached the pipes are rigidly held in proper alignment so the welding of the joint can be effected with maximum efficiency; even when the pipes are of slightly different diameters the pipes are brought to and held in axial alignment and the difference between them uniformly distributed circumferentially of the joint thereby enabling a uniform seam to be made during the welding.

While I have herein described one embodiment of the invention with considerable particularity it will be understood that the principles thereof are applicable to pipe alignment clamps of various types other than that to which I have referred while changes and modifications in the form, construction, arrangement of parts and operation of the mechanism contemplated by the invention will readily occur to those skilled in the art and may be made if desired without departing from the spirit and scope of the invention as defined in the appended claims.

Having thus described my invention, I claim and desire to protect by Letters Patent of the United States:

1. In an internal alignment pipe clamp comprising a plurality of coaxial complementary relatively movable segments each including a pair of arcuate plates having convex outer edges disposed in parallel axially spaced planes and means rigidly securing the plates together in axially spaced relation to provide a slot therebetween, a shoe seating on each segment having convex outwardly projecting parallel arcuate pipe engaging ribs spaced axially more widely than the spacing of the segment plates, concave arcuate surfaces coaxial with said ribs and the plates respectively engageable by the outer edges of the plates and a fin interposed between said concave arcuate surfaces and extending radially inward therefrom between the plates and normally in axially spaced relation thereto, means operable to project the segments simultaneously radially outward relatively to each other, and means for loosely securing the shoes respectively to the segments for rocking movement about the edge of either plate parallel to the axis of the clamp.

2. In an internal alignment pipe clamp, a plurality of radially expansible segments each having spaced arcuate convex outer surfaces and an inwardly extending slot between them, a shoe conforming to and normally seating against said surfaces having a fin projecting loosely into the slot and normally spaced from the walls thereof, means yieldingly biasing the shoe toward the segment adapted to enable the shoe to rock laterally selectively on the arcuate surfaces of the segment to the extent limited by the clearance between the fin and walls of the slot, and means for simultaneously moving the segments radially outward relatively to each other.

3. In internal alignment pipe clamp comprising relatively movable complementary segments providing arcuate slots extending inwardly from their outermost convex peripheral edges normal to their common axis, a shoe carried by each segment adapted to normally seat on said edges and having a fin extending loosely into the adjacent slot and normally spaced from the walls thereof and a segmental head comprising spaced outwardly projecting segmental ribs respectively adapted to contact the inner surfaces of the ends of two pipe sections when in juxtaposed relation, said fin by engagement of its inner extremity with either wall of the slot operating to limit lateral angular movement of the shoe about either of said peripheral edges in a plane containing the axis of the clamp, and means for simultaneously moving the segments radially outward relatively to each other.

References Cited in the file of this patent
UNITED STATES PATENTS

| | | |
|---|---|---|
| 1,642,825 | Pearca | Sept. 20, 1927 |
| 1,884,144 | Norquist | Oct. 25, 1932 |
| 2,413,103 | Forbes | Dec. 24, 1946 |
| 2,429,053 | Forbes | Oct. 14, 1947 |
| 2,615,414 | Adams et al. | Oct. 28, 1952 |